United States Patent [19]
Tüschen

[11] Patent Number: 5,819,895
[45] Date of Patent: Oct. 13, 1998

[54] BRIDGING DEVICE FOR A HYDRODYNAMIC HYDRAULIC COUPLING

[75] Inventor: Alfred Tüschen, Lennestadt-Saalhausen, Germany

[73] Assignee: Tuschen & Zimmermann, Germany

[21] Appl. No.: 683,876

[22] Filed: Jul. 19, 1996

[30] Foreign Application Priority Data

Jul. 26, 1995 [DE] Germany ................. 195 27 292.7

[51] Int. Cl.⁶ ............................................. F16H 45/02
[52] U.S. Cl. .............................................. 192/3.3
[58] Field of Search ..................... 192/3.28, 3.29, 192/3.3, 3.31

[56] References Cited

U.S. PATENT DOCUMENTS

| | | | |
|---|---|---|---|
| 2,093,498 | 9/1937 | Walti | 192/3.29 X |
| 2,226,802 | 12/1940 | Black | 192/3.3 X |
| 3,516,524 | 6/1970 | Kelty et al. | 192/3.3 |
| 3,537,262 | 11/1970 | Briski . | |

FOREIGN PATENT DOCUMENTS

| | | |
|---|---|---|
| 1062 788A | 4/1954 | France . |
| 10 52 768B | 3/1959 | Germany . |
| 11 92 016B | 3/1961 | Germany . |
| 15 30 661A | 7/1969 | Germany . |
| 21 20 619A | 11/1972 | Germany . |

*Primary Examiner*—Richard M. Lorence
*Attorney, Agent, or Firm*—Meltzer, Lippe, Goldstein, et al.

[57] ABSTRACT

A bridging device for hydrodynamic hydraulic couplings (1), more particularly for turbo couplings of variable or constant filling, which couple a prime mover to a machine and whose input shaft (5) can be coupled by means of the bridging device (D), having a force-transmitting device (11), to its output shaft (8) to increase efficiency of transmission. The force-transmitting device (11) of the bridging device (D) is uncoupled from the rotary motion of the hydraulic coupling (1) and can be controlled by means of a control device disposed outside the casing (2), the bridging device being controllable by means of a fluid.

9 Claims, 2 Drawing Sheets

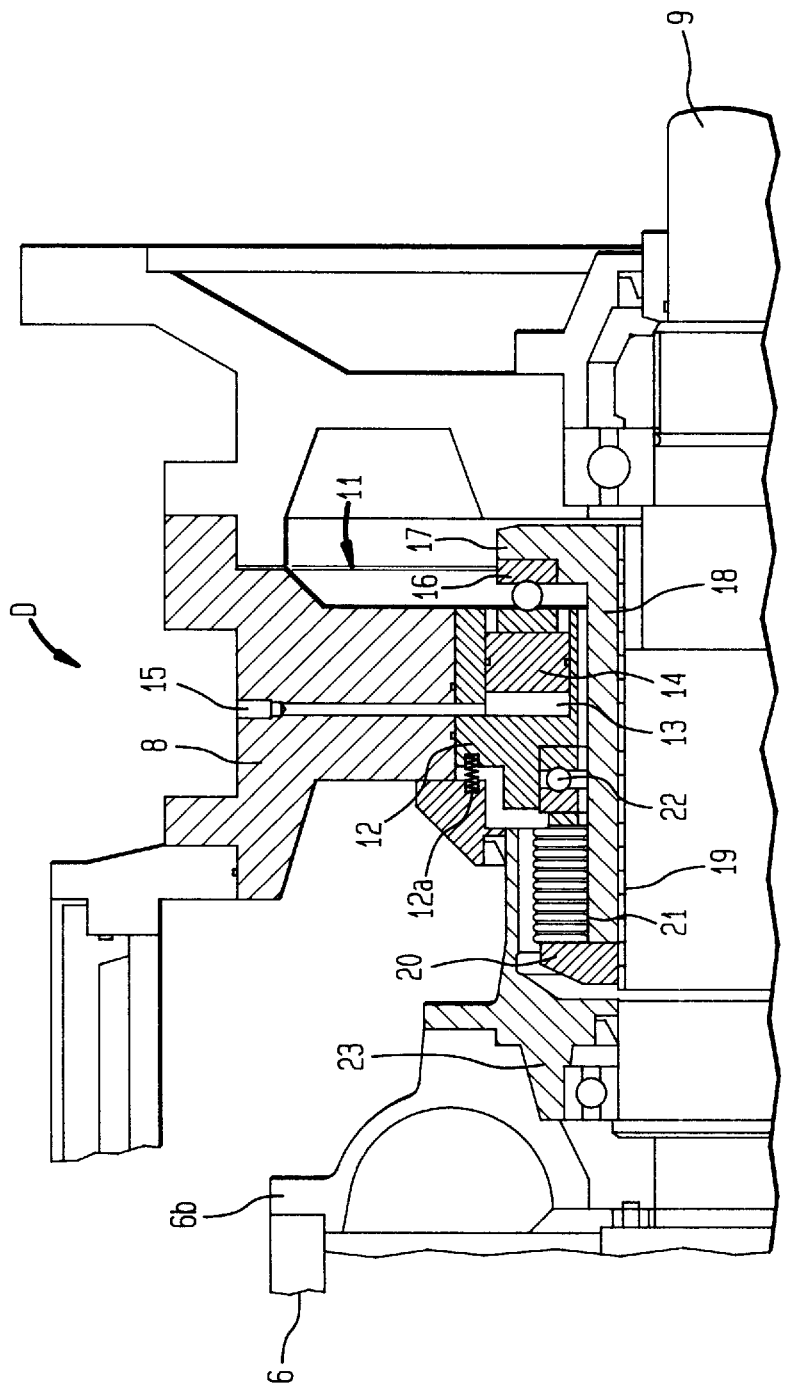

BRIDGING DEVICE FOR A HYDRODYNAMIC HYDRAULIC COUPLING

FIELD OF THE INVENTION

The invention relates to a bridging device for hydrodynamic hydraulic couplings, and more particularly for turbo couplings of variable or constant filling, which couple a prime mover to a machine and whose input shaft can be coupled by means of the bridging device, having a force-transmitting device, to its output shaft to increase efficiency of transmission. Hydraulic couplings of the kind specified are used for transmitting energy of motion from a prime mover to a machine by means of a generally free-flowing operating medium.

BACKGROUND OF THE INVENTION

A large number of hydraulic couplings of the kind specified are known. These couplings all share the feature that they have at least one pump impeller which is connected to the input shaft and circulates the operating medium, thus driving a turbine wheel connected to the output shaft. The advantage of such a coupling of input and output shafts is, for example, that it enables a machine to be started up steplessly from stationary to operating speed independently of its direction of rotation and without torque conversion. Moreover, due to the non-rigid connection between the input and the output shafts, hydrodynamic couplings have considerable elasticity, even with changing loadings.

The non-rigid connection between the input and output shafts always causes some loss in the transmission of driving power. For this reason it has been suggested that the input and output shafts of a hydrodynamic coupling should be connected by means of a bridging device for corotation after the operating speed has been reached. Such devices in the form of bridging couplings and gear-shifting couplings are known from motor vehicle converters and turbo couplings with constant filling. A coupling of this kind is described, for example, in DUBBEL: Manual of Mechanical Engineering, 15th Impression, 1983, pp. 904 et seq.

All the known bridging devices share the feature of being equipped with a piston-cylinder member which rotates at the same speed as one of the rotating members of the coupling in question. This member is usually the primary member of the hydraulic coupling. At the same time, in the known hydraulic couplings equipped with a bridging device, the bridging device is actuated by the same pressurized liquid by which the hydraulic coupling itself also operates.

It is an object of the invention to provide a bridging device for a hydraulic coupling of the kind specified which can be actuated independently of the particular operational state of the coupling.

SUMMARY OF THE INVENTION

The above stated problem is solved according to the invention by the features that the force-transmitting device of the bridging device is uncoupled from the rotary motion of the hydraulic coupling and can be controlled by means of a control device disposed outside the casing, the bridging device being controllable by means of a fluid.

According to the invention the principle of automatically bridging the hydraulic coupling, shared by the known hydraulic couplings, is abandoned in favour of a bridging device disposed outside the hydraulic coupling and operating independently of its operational state, and a control device. This enables, for example, a rigid corotational connection to be made between the input shaft and the output shaft even if the required operational speed has not yet been reached, but fluctuations in speed or loading are no longer to be expected. In exactly the same way, the high elasticity of the hydraulic coupling can still be maintained even when the operational speed has been reached. At the same time the control of the bridging device by means of a fluid ensures that the forces required to bridge the turbo coupling are reliably and precisely exerted.

The invention reduces costs by the feature that the bridging device comprises a force-transmitting device uncoupled from the rotation of the input and output shafts, a bridging coupling and loading tongs. In that case the force-transmitting device exerts an actuating force on the bridging coupling via the loading tongs, while the loading tongs so engage tongs-fashion around the force-transmitting device and the bridging coupling that when the bridging device is operative, no axial forces are exerted on the elements of the hydraulic coupling.

With such a design of the invention, the force-transmitting device is disposed non-rotatably as part of the bridging device. The result is simplicity of manufacture and a low maintenance requirement. Moreover, it is possible with a bridging device thus designed to exert considerable actuating forces which ensure the reliable transmission of high torques.

The latter applies more particularly if the force-transmitting device takes the form of a piston-cylinder unit. A readily manufacturable piston-cylinder unit of this kind is characterized according to the invention by the features that the cylinder of the force-transmitting device takes the form of a cylinder groove, the piston of the force-transmitting device taking the form of an annular piston, and the force-transmitting device is disposed coaxially of the input shaft or the output shaft. In this way other fluids than those from the force transmission between the input and output shafts can be used for the hydraulic control of the bridging device.

Also advantageously the bridging coupling used in the bridging device takes the form of a friction coupling, more particularly a multiple disc coupling. The use of such couplings to bridge the hydraulic coupling readily enables the bridging device to be adequately dimensioned, to meet demands made on said device.

The use of friction coverings is more particularly advantageous if on its side remote from the bridging coupling, the force-transmitting device acts on the loading tongs which are disposed coaxially of the input or output shaft and can be moved coaxially thereof and which press on the side of the bridging coupling remote from the force-transmitting device. The loading tongs are therefore constructed tongs-fashion. If the cylinder body of the force-transmitting device is also disposed axially displaceably in the casing of the bridging device, the number of friction areas can be adapted in a problem-free manner to the torque to be transmitted, more particularly if multiple disc couplings are used.

In many applications it will be advantageous if the control device controls the bridging device in dependence on speeds of different output shafts or input shafts whose speed is to be synchronized.

As already mentioned, the bridging device can always be actuated independently of the operational state of the turbo coupling. This enables the special properties of the turbocoupling, such as its elasticity or the adjustability of its force-transmitting behaviour, to be utilized in all operational situations. As a result it is a simple matter to synchronize with one another the speed of individual shafts jointly driving a machine, for example, a conveyor belt or an underground conveyor chain. In particular, when several output shafts are driving a single conveyor belt, an operator can easily visually detect if one of the output shafts is lagging behind the others. In addition, conventional electronic means (such as a simple speedometer) may be used to determine the RPM of each shaft. As stated, when one shaft is detected as non-synchronized, the rigid bridging connection is disengaged and the hydraulic coupling can easily equalize the shaft speed differences.

BRIEF DESCRIPTION OF THE DRAWINGS

An embodiment of the invention will now be explained in greater detail with reference to the drawings, which show:

FIG. 2 an enlarged view of a section A of FIG. 1.

DETAILED DESCRIPTION OF THE PREFERRED EMBODIMENTS

Figure 1:
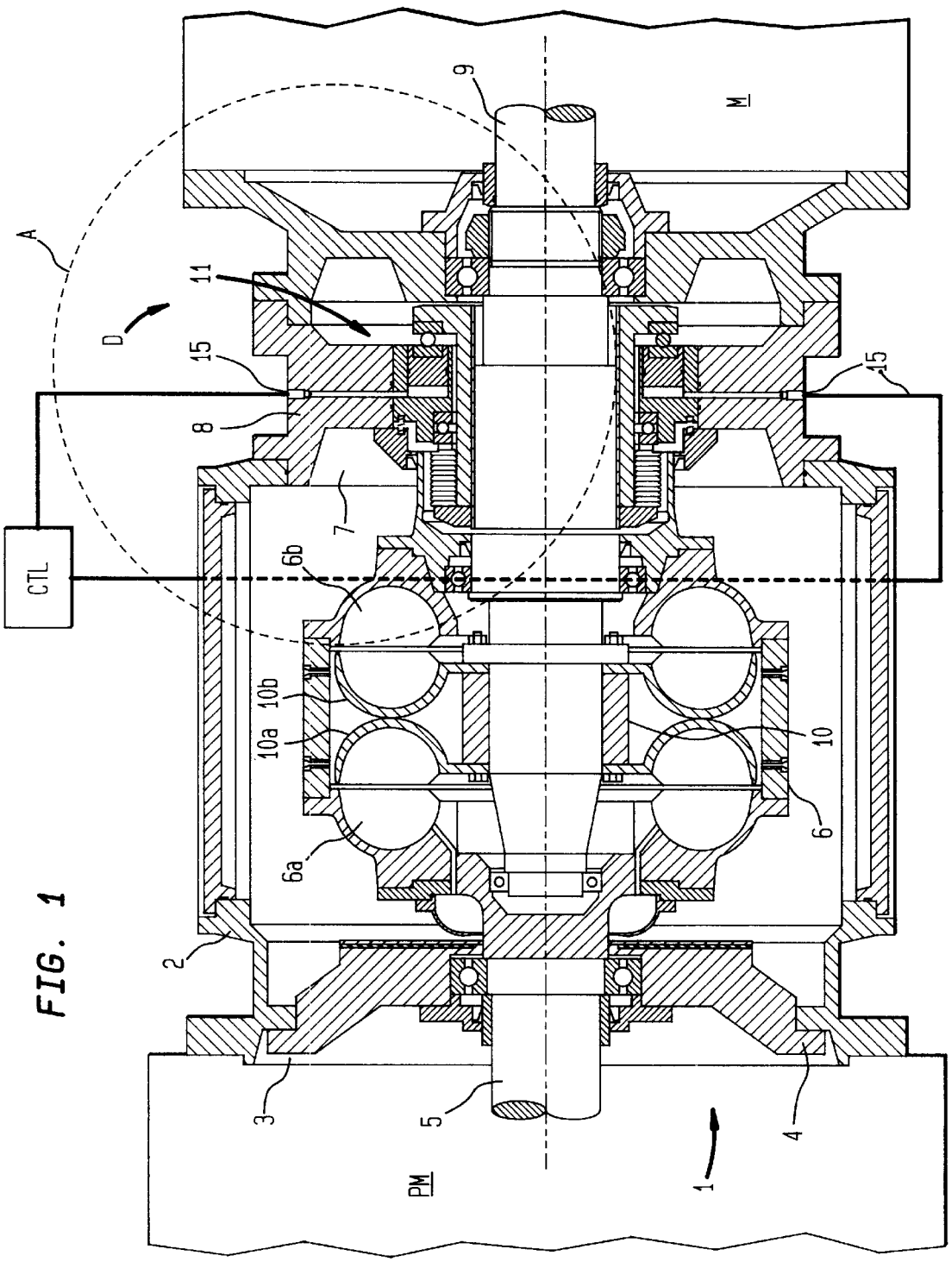
FIG. 1 a bridging device with a hydraulic coupling in longitudinal section.

Referring to FIG. 1, a hydraulic coupling 1 has a coupling casing 2 into one 3 of whose coupling flange openings a driving flange 4 is inserted. An input shaft 5 connected to a prime mover PM extends into the casing 2 through a central opening in the drive flange 4.

The input shaft 5 is connected for corotation to the first half 6a of a pump impeller 6. The second half 6b of the pump impeller 6 is constructed laterally inverted in relation to the first half 6a and is connected for corotation thereto.

Flange 8 of a bridging device D is inserted into the second coupling flange opening 7 of the coupling casing 2. An output shaft 9 connected to a machine M extends out of the coupling casing 2 through said flange 8 of the bridging device D. In the interior of the casing 2 the output shaft 9 is connected for corotation to a turbine wheel 10, each of whose two halves 10a, b is associated with one of the halves 6a, b of the pump impeller 6.

Disposed coaxially of the output shaft 9 is a force-transmitting device 11 taking the form of a piston-cylinder unit. Just like the flange 8, the force-transmitting device 11 is part of the bridging device D. The bridging device D is controlled by a control device (not shown) disposed outside the coupling casing 2.

The force-transmitting device 11 has an annular cylinder body 12 which can be displaced coaxially of the output shaft 9 in the opening of the flange 8 by means of an adjusting device 12a. The cylinder body 12 is formed with a circularly extending cylinder groove 13 in which an annular piston 14 is displaceably inserted. The cylinder groove 13 is connected via control lines 15 to a control device CTR.

The annular piston 14 bears via a first axial bearing 16 against a first, radially outwardly directed tongs shoulder 17 constructed at the end of loading tongs 18 which are formed after the fashion of a sleeve and are disposed coaxially of the output shaft 9 and can be displaced coaxially thereof. The loading tongs 18 are connected for corotation to the output shaft 9 via a multi-tooth profile 19.

Constructed on the other end of the loading tongs 18, associated with the interior of the casing 2, is a second, also radially outwardly directed tongs shoulder 20, which acts on the end, associated with the inside of the clutch casing 2, of a bridging coupling 21 taking the form of a multiple disc coupling and disposed between the tongs shoulder 20 and the cylinder body 12.

A bridging coupling 21 bears by its other end via a second axial bearing 22 against the cylinder body 12. The inner discs of the bridging coupling 21 are non-rotatably connected to the loading tongs 18, while the outer discs of the bridging coupling 21 are non-rotatably connected to a pump impeller bearing shell 23 formed on the second half 6b of the pump impeller 6.

The hydraulic coupling 1 explained hereinbefore operates as follows:

Torque generated by a prime mover (not shown) is converted via the pump impeller 6 connected to the input shaft 5 into hydraulic energy of an operating medium, for example, water contained in the casing 2. The hydraulic energy of the operating medium is converted back into mechanical energy via the turbine wheel 10. With the bridging coupling 21 inoperative, the hydraulic coupling 1 transmits energy introduced via the input shaft 5 to the output shaft 9 with a typical efficiency of 0.95 to 0.97.

For the actuation of the bridging device D, a fluid, for example hydraulic oil, is introduced from the control device (not shown) via the control lines 15 into the cylinder groove 13. The accompanying increase in pressure inside the cylinder groove 13 causes the annular piston 14 to be disengaged from said cylinder groove 13. By the disengagement of the annular piston 14 the actuating tongs 18 are displaced on the output shaft 9 and coaxially thereof in the direction of disengagement of the annular piston 14. By this displacement the discs of the bridging coupling 21 are clamped between the second tongs shoulder 20 and the second axial bearing 22. As soon as an adequate coupling force is thus exerted on the bridging coupling 21, the input shaft 5 is connected for corotation to the output shaft 9 via the pump impeller 6, the bridging coupling 21, the loading tongs 18 and the longitudinal toothing 19. At the same time, due to the fact that the loading tongs 18 engage tongs-fashion around the force-transmitting device 11 and the bridging coupling 21, no axial forces are exerted on the elements of the hydraulic coupling 1.

With a reduction of the pressure in the cylinder groove 13 the bridging coupling 21 is unloaded, so that the corotational connection between the input shaft 5 and the output shaft 9 is again released.

The fact that the force-transmitting device 11 can be operated from outside enables the bridging coupling 21 to be rendered inoperative even after the operating speed has been reached, in order to utilize the elasticity of the hydraulic coupling 1, for example, for the synchronization of different shafts jointly driving a machine.

I claim:

1. A hydrodynamic hydraulic coupling, comprising:
    an input shaft connected to a prime mover;
    an output shaft connected to a machine; and
    a bridging device for increasing the efficiency of said hydraulic coupling and for selectively rigidly coupling said input shaft to said output shaft, said bridging device comprising a force-transmitting device being disposed coaxially about one of said input and output shafts,
    wherein said force-transmitting device being activated, independently of the operation of said input and output shafts, by fluid from a control device external to said hydraulic coupling.

2. The hydraulic coupling according to claim 1, said bridging device further comprising:
    a bridging coupling for connecting in co-rotation said input shaft to said output shaft; and
    loading tongs for selectively coupling said bridging coupling and said force-transmitting device, wherein when the bridging device is in an operative mode, based on said control device, substantially no forces act in the axial direction on said hydraulic coupling.

3. The hydraulic coupling according to claim 2, wherein said force-transmitting device being a piston-cylinder unit.

4. The hydraulic coupling according to claim 3, wherein said force-transmitting device includes a cylinder groove for receiving said fluid from said control device and an annular piston, operative by the pressure of said fluid, for activating said loading tongs.

5. The hydraulic coupling according to claim 4, wherein said bridging coupling being a multiple disc coupling.

6. The hydraulic coupling according to claim 5, wherein said control device activates said bridging device for rigidly coupling said input and output shafts, such that when said control device deactivates said bridging device, said input shaft is non-rigidly connected to said output shaft.

7. The hydraulic coupling according to claim 6, wherein said control device activates and deactivates said bridging device based on whether the rotational speed of any of said shafts is non-synchronized.

8. The hydraulic coupling according to claim 6, wherein the control of said bridging device by said control device is independent of the control of said hydraulic coupling.

9. The hydraulic coupling according to claim 7, wherein said machine being a conveyor belt.

* * * * *